US012761071B2

(12) United States Patent
Liu et al.

(10) Patent No.: US 12,761,071 B2
(45) Date of Patent: Oct. 13, 2026

(54) SENSOR PACKAGE STRUCTURE AND SENSING MODULE THEREOF

(71) Applicant: TONG HSING ELECTRONIC INDUSTRIES, LTD., Taoyuan City (TW)

(72) Inventors: Yu-Hsiang Liu, Taoyuan City (TW); Li-Chun Hung, Taoyuan City (TW)

(73) Assignee: TONG HSING ELECTRONIC INDUSTRIES, LTD., Taoyuan City (TW)

( * ) Notice: Subject to any disclaimer, the term of this patent is extended or adjusted under 35 U.S.C. 154(b) by 299 days.

(21) Appl. No.: 18/795,136

(22) Filed: Aug. 5, 2024

(65) Prior Publication Data

US 2025/0354862 A1 Nov. 20, 2025

(30) Foreign Application Priority Data

May 16, 2024 (TW) ................................ 113118037

(51) Int. Cl.
*G01J 1/02* (2006.01)

(52) U.S. Cl.
CPC .................................. *G01J 1/0271* (2013.01)

(58) Field of Classification Search
CPC ..... H10F 39/804; H10F 39/011; H10F 39/024
See application file for complete search history.

(56) References Cited

U.S. PATENT DOCUMENTS 10,340,306 B1 7/2019 Skeete
10,986,292 B2 4/2021 Mishima et al.
2007/0190691 A1* 8/2007 Humpston .......... B81C 1/00269 438/464
2024/0170512 A1* 5/2024 Hanaoka ............... H10F 39/011

* cited by examiner

*Primary Examiner* — Thanh Luu
(74) *Attorney, Agent, or Firm* — Li & Cai Intellectual Property Office

(57) ABSTRACT

A sensor package structure and a sensing module thereof are provided. The sensing module includes a sensor chip, a light-permeable layer, and a ring-shaped supporting layer that is sandwiched between the sensor chip and the light-permeable layer. The ring-shaped supporting layer includes a plurality of strip segments and a plurality of arc-shaped segments that are connected to the strip segments. The inner surface of the light-permeable layer includes a plurality of straight edges and a plurality of rounded corners. The straight edges are respectively arranged adjacent to the strip segments, and are each spaced apart from the adjacent strip segment by a first inward distance. The rounded corners are respectively arranged adjacent to the arc-shaped segments, and are each spaced apart from the adjacent arc-shaped segment by a second inward distance that is within a range from 95% to 105% of the first inward distance.

16 Claims, 8 Drawing Sheets

SENSOR PACKAGE STRUCTURE AND SENSING MODULE THEREOF

CROSS-REFERENCE TO RELATED PATENT APPLICATION

This application claims the benefit of priority to Taiwan Patent Application No. 113118037, filed on May 16, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a package structure, and more particularly to a sensor package structure and a sensing module thereof.

BACKGROUND OF THE DISCLOSURE

A conventional sensor package structure includes a glass, a sensor chip, and an adhesive layer that is sandwiched between the glass and the sensor chip. The conventional sensor package structure is formed with a long gap corresponding in position to the adhesive layer and each corner of the glass having a right angle, such that an encapsulant of the conventional sensor package structure cannot fill into an entirety of the long gap, and a void (or bubble) is easily formed in the long gap.

SUMMARY OF THE DISCLOSURE

In response to the above-referenced technical inadequacies, the present disclosure provides a sensor package structure and a sensing module thereof for effectively improving on the issues associated with conventional sensor package structures.

In order to solve the above-mentioned problems, one of the technical aspects adopted by the present disclosure is to provide a sensor package structure, which includes a substrate, a sensor chip, a ring-shaped supporting layer, a light-permeable layer, and an encapsulant. The sensor chip is disposed on and electrically coupled to the substrate. Moreover, a top surface of the sensor chip has a sensing region and a carrying region that surrounds the sensing region. The ring-shaped supporting layer is disposed on the carrying region of the sensor chip and surrounds the sensing region. The ring-shaped supporting layer includes a plurality of strip segments and a plurality of rounded corner segments, and any two of the strip segments adjacent to each other are connected through one of the arc-shaped segments. The light-permeable layer is disposed on the ring-shaped supporting layer. The light-permeable layer, the ring-shaped supporting layer, and the top surface of the sensor chip jointly define an enclosed space. An inner surface of the light-permeable layer has a plurality of straight edges and a plurality of rounded corners. The straight edges are respectively arranged adjacent to and parallel to the strip segments.

Any one of the straight edges is spaced apart from an adjacent one of the strip segments by a first inward distance. The rounded corners are respectively arranged adjacent to the arc-shaped segments. Any two of the straight edges adjacent to each other are connected through one of the rounded corners. Any one of the rounded corners is spaced apart from an adjacent one of the arc-shaped segments by a second inward distance that is within a range from 95% to 105% of the first inward distance. The encapsulant is formed on the substrate. The sensor chip, the ring-shaped supporting layer, and the light-permeable layer are embedded in the encapsulant, and an outer surface of the light-permeable layer arranged away from the substrate is at least partially exposed from the encapsulant.

In order to solve the above-mentioned problems, another one of the technical aspects adopted by the present disclosure is to provide a sensing module of a sensor package structure, which includes a sensor chip, a ring-shaped supporting layer, and a light-permeable layer. A top surface of the sensor chip has a sensing region and a carrying region that surrounds the sensing region. The ring-shaped supporting layer is disposed on the carrying region of the sensor chip and surrounds the sensing region. The ring-shaped supporting layer includes a plurality of strip segments and a plurality of rounded corner segments, and any two of the strip segments adjacent to each other are connected through one of the arc-shaped segments. The light-permeable layer is disposed on the ring-shaped supporting layer. The light-permeable layer, the ring-shaped supporting layer, and the top surface of the sensor chip jointly define an enclosed space. An inner surface of the light-permeable layer has a plurality of straight edges and a plurality of rounded corners. The straight edges are respectively arranged adjacent to and parallel to the strip segments. Any one of the straight edges is spaced apart from an adjacent one of the strip segments by a first inward distance. The rounded corners are respectively arranged adjacent to the arc-shaped segments. Any two of the straight edges adjacent to each other are connected through one of the rounded corners. Any one of the rounded corners is spaced apart from an adjacent one of the arc-shaped segments by a second inward distance that is within a range from 95% to 105% of the first inward distance.

Therefore, the light-permeable layer of the sensor package structure in the present disclosure is provided with the rounded corners having a specific condition (e.g., the second inward distance is within a range from 95% to 105% of the first inward distance), so that a gap between the light-permeable layer and the sensor chip corresponding in position to any one of the arc-shaped segments can be effectively shortened, and the gap can be fully filled with the encapsulant, thereby preventing any bubble from existing therein.

Specifically, in any one of the sensor package structure and the sensing module of the present disclosure, since the gap can be effectively shortened, a portion of the encapsulant in the gap has a small volume for reducing a stress applied on any one of the arc-shaped segments of the ring-shaped supporting layer.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
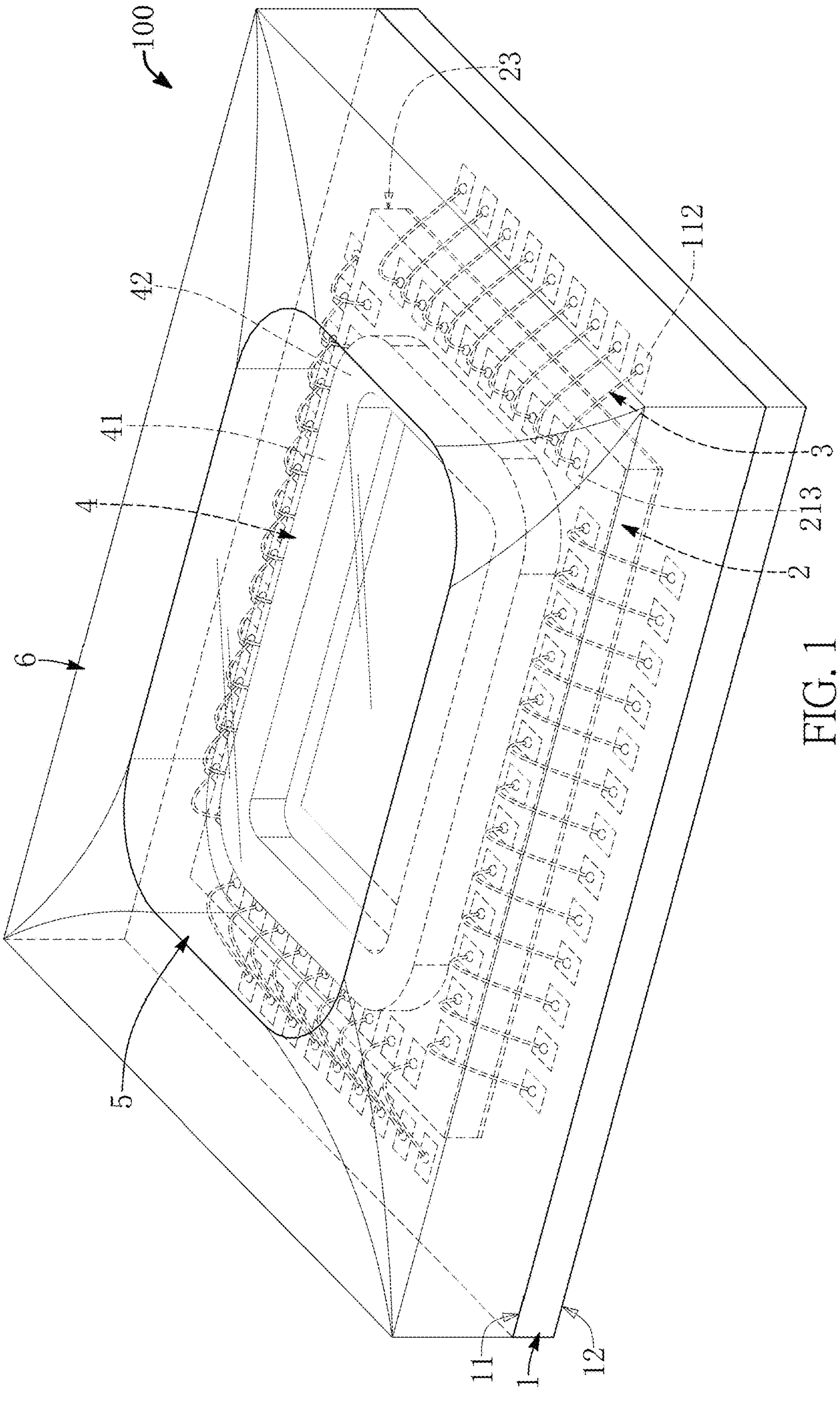
FIG. 1 is a schematic perspective view of a sensor package structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 7, a first embodiment of the present disclosure is provided. As shown in FIG. 1, the present embodiment provides a sensor package structure 100. In other words, any package structure not encapsulating a sensor chip therein has a structural design different from that of the sensor package structure 100 of the present embodiment.

Figure 2:
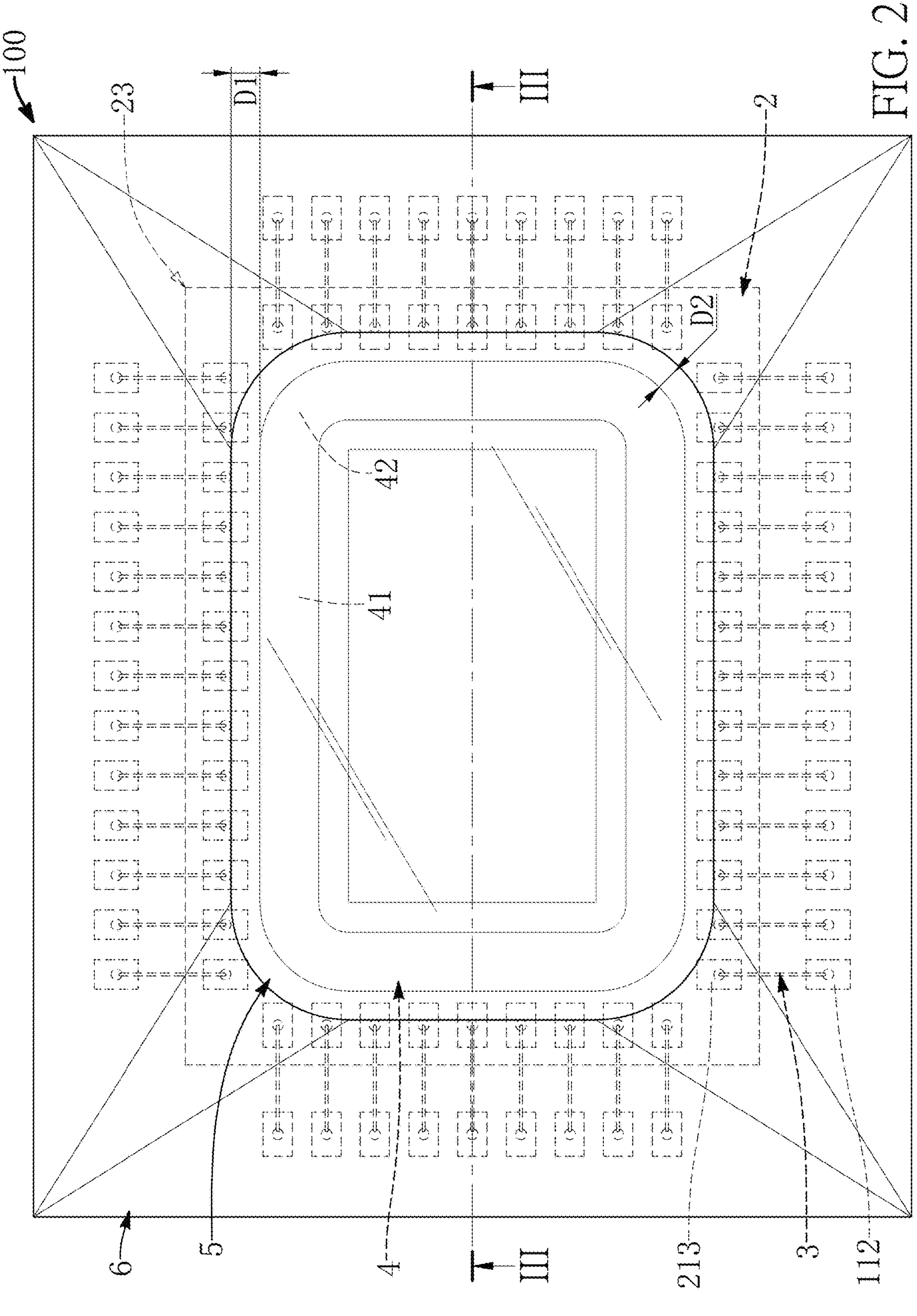
FIG. 2 is a schematic top view of FIG. 1.
Figure 3:
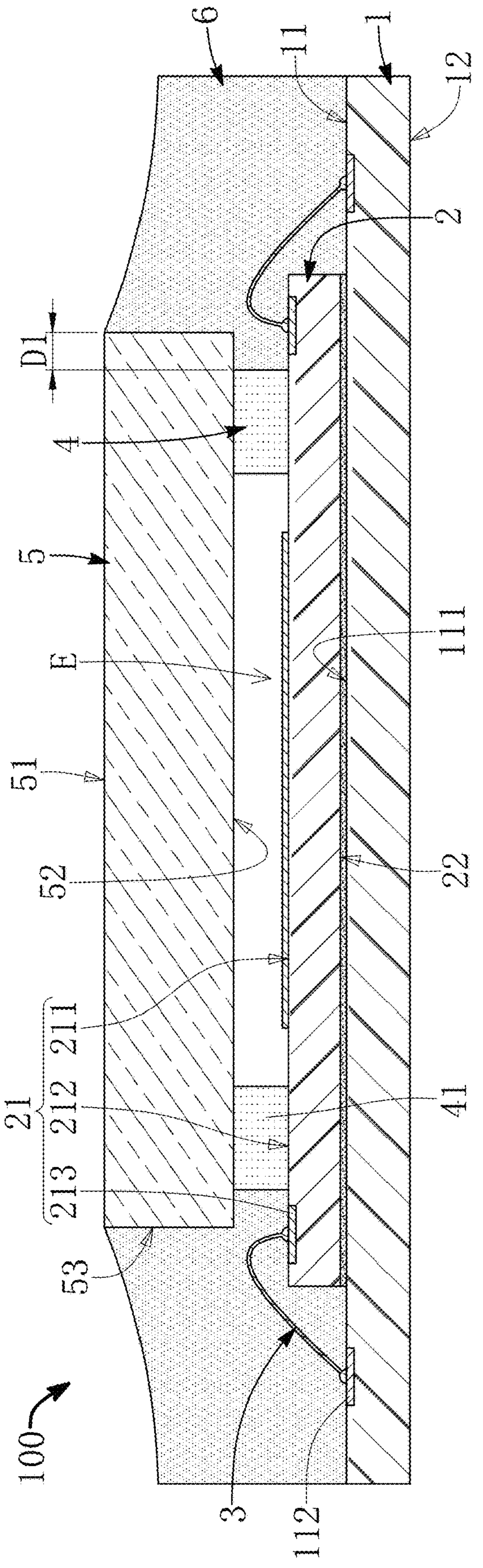
FIG. 3 is a schematic cross-sectional view taken along line III-III of FIG. 2.

As shown in FIG. 1 to FIG. 3, the sensor package structure 100 in the present embodiment includes a substrate 1, a sensor chip 2 disposed on the substrate 1, a plurality of metal wires 3 electrically coupled to the sensor chip 2 and the substrate 1, a ring-shaped supporting layer 4 disposed on the sensor chip 2, a light-permeable layer 5 disposed on the ring-shaped supporting layer 4, and an encapsulant 6 that is formed on the substrate 1. It should be noted that the ring-shaped supporting layer 4 in the present embodiment is sandwiched between the sensor chip 2 and the light-permeable layer 5 for being jointly defined as a sensing module.

The sensor package structure 100 in the present embodiment includes the above components, but can be adjusted or changed according to design requirements. For example, in other embodiments of the present disclosure not shown in the drawings, the sensor package structure 100 can be provided without the metal wires 3, and the sensor chip 2 is fixed onto and electrically coupled to the substrate 1 in a flip-chip manner; or the sensing module can be independently used (e.g., sold) or can be used in cooperation with other components. The structure and connection relationship of each component of the sensor package structure 100 are described in the following description.

The substrate 1 of the present embodiment has a square shape or a rectangular shape, but the present disclosure is not limited thereto. An upper surface 11 of the substrate 1 includes a chip-bonding region 111 arranged approximately on a center portion thereof, and the substrate 1 includes a plurality of bonding pads 112 that are disposed on the first surface 11 and are arranged outside of the chip-bonding region 111. The bonding pads 112 in the present embodiment are in an annular arrangement, but the present disclosure is not limited thereto. For example, in other embodiments of the present disclosure not shown in the drawings, the bonding pads 112 can be arranged in two rows respectively at two opposite sides of the chip-bonding region 111.

In addition, the substrate 1 can be further provided with a plurality of solder balls (not labeled in the drawings) disposed on a lower surface 12 thereof. The substrate 1 can be soldered onto an electronic component (not shown in the drawings) through the solder balls, thereby electrically connecting the sensor package structure 100 to the electronic component.

The sensor chip 2 preferably has a square shape or a rectangular shape having a plurality of right angles 23, and the sensor chip 2 in the present embodiment is an image sensing chip, but the present disclosure is not limited thereto. The sensor chip 2 is fixed onto the chip-bonding region 111 of the substrate 1 through a bottom surface 22 thereof. In other words, the sensor chip 2 is arranged to be surrounded on the inside of the bonding pads 112. Moreover, a top surface 21 of the sensor chip 2 has a sensing region 211 and a carrying region 212 that has an annular shape surrounding the sensing region 211. Two ends of each of the metal wires 3 are respectively connected to the substrate 1 and the carrying region 212 of the sensor chip 2, thereby establishing an electrical connection between the substrate 1 and the sensor chip 2.

Specifically, the sensor chip 2 in the present embodiment includes a plurality of connection pads 213 arranged on the carrying region 212 (e.g., the connection pads 213 are located outside of the sensing region 211). Moreover, the quantity and positions of the connection pads 213 of the sensor chip 2 in the present embodiment correspond to those of the bonding pads 112 of the substrate 1. In other words, the connection pads 213 of the present embodiment are in an annular arrangement. Furthermore, the two ends of each of the metal wires 3 are respectively connected to one of the bonding pads 112 and the corresponding connection pad 213.

Figure 4:
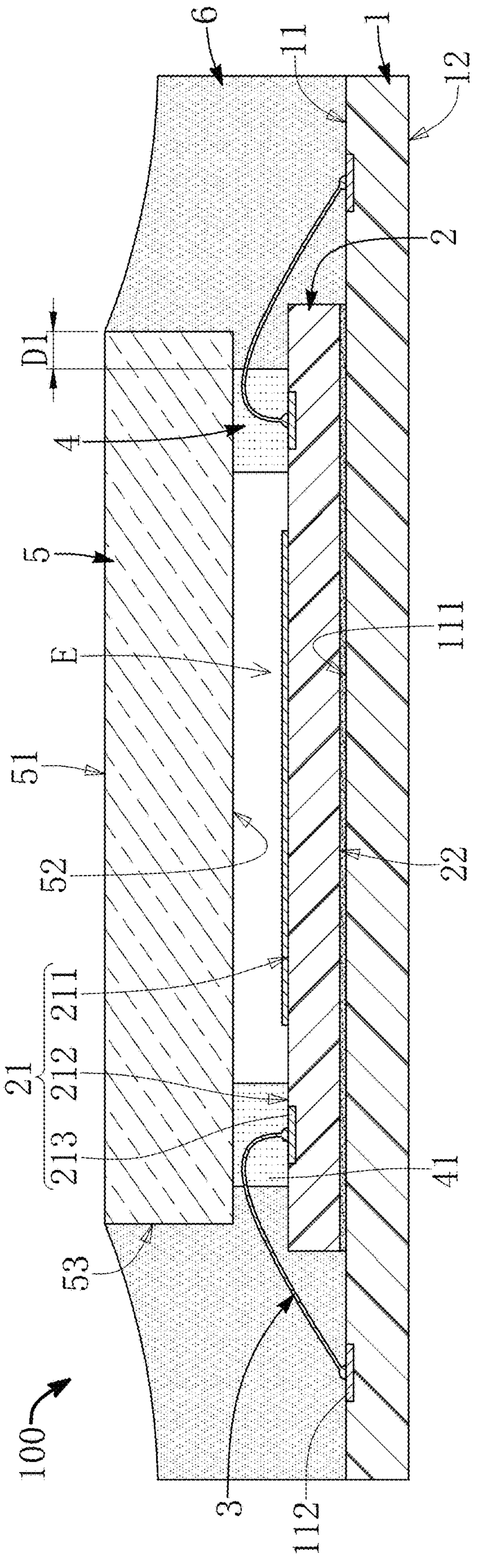
FIG. 4 is a schematic cross-sectional view showing another configuration of FIG. 3.
Figure 5:
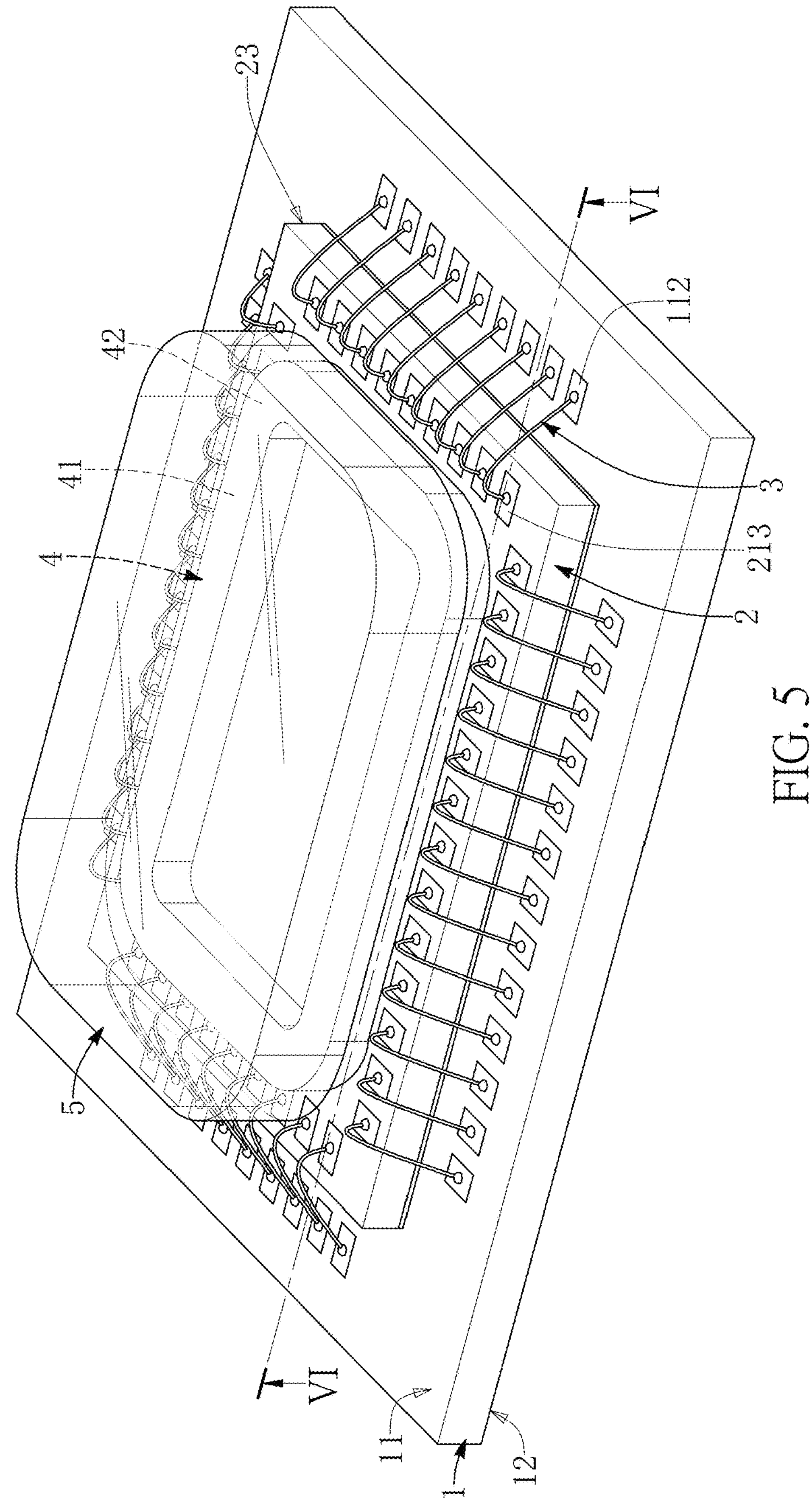
FIG. 5 is a schematic perspective view showing the sensor package structure of FIG. 1 when an encapsulant is omitted.
Figure 6:
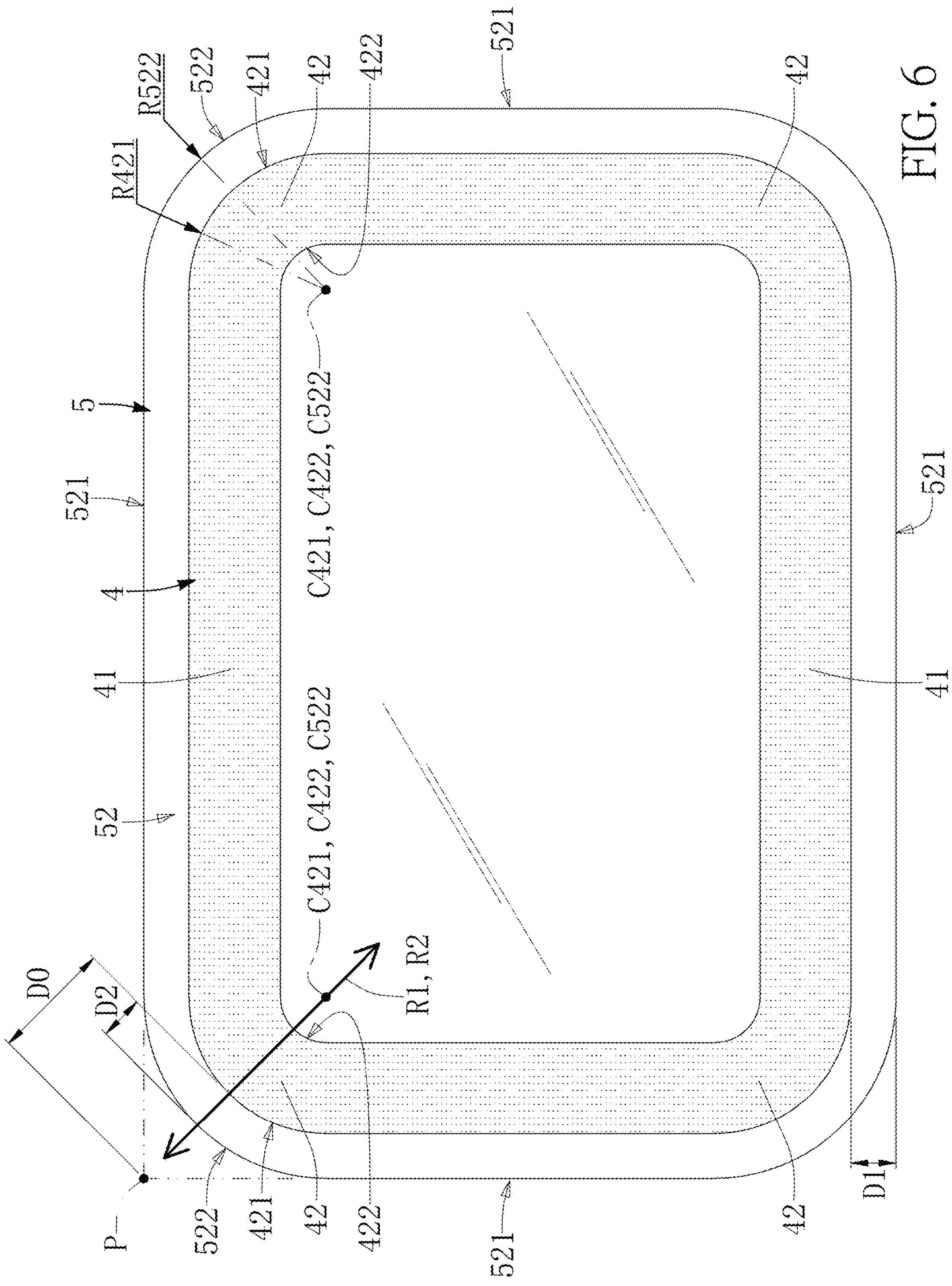
FIG. 6 is a schematic cross-sectional view taken along line VI-VI of FIG. 5.
Figure 7:
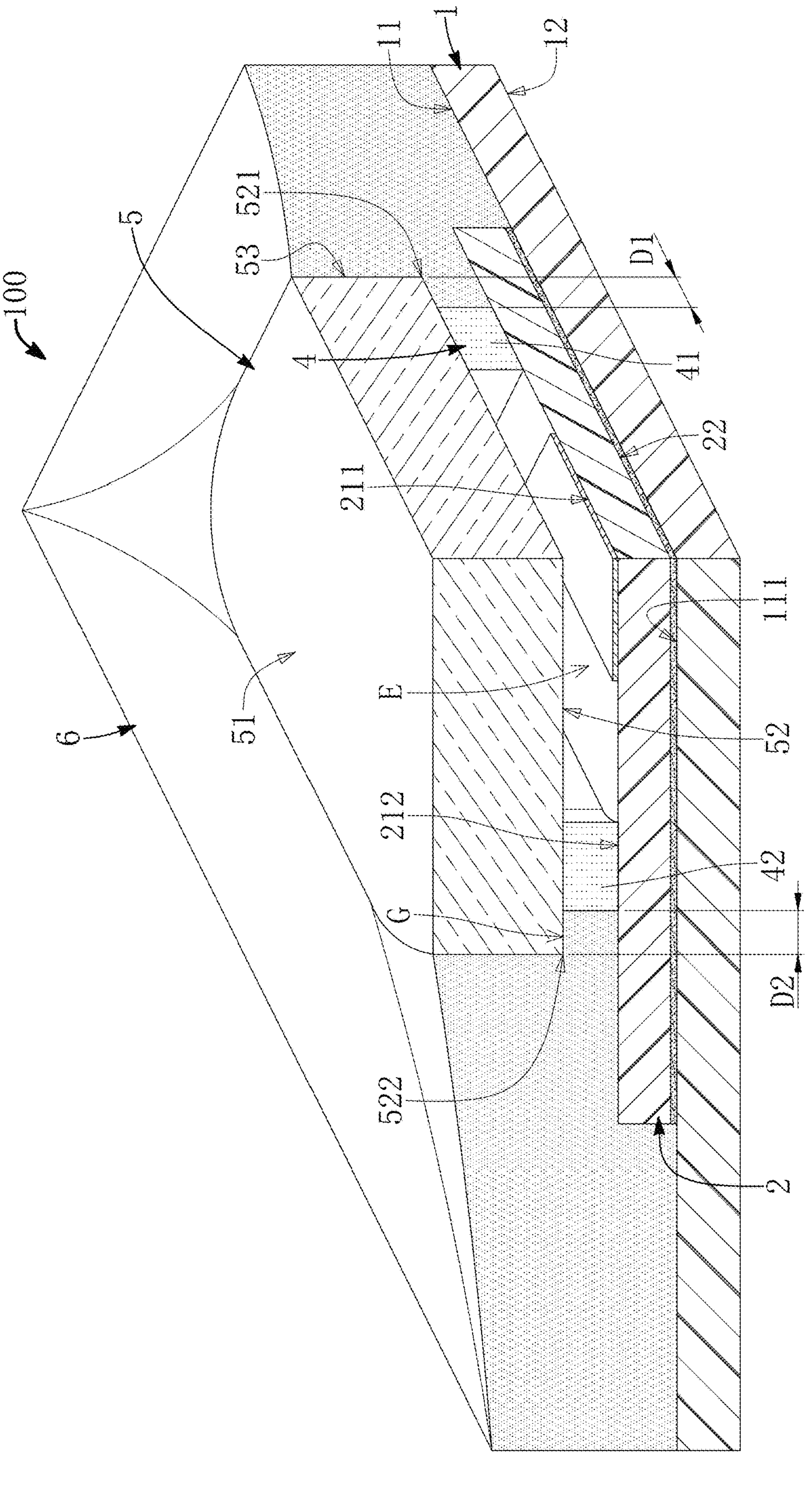
FIG. 7 is a perspective cross-sectional view of FIG. 1.

The ring-shaped supporting layer 4 is disposed on the carrying region 212 of the sensor chip 2 and surrounds the sensing region 211 of the sensor chip 2. In the present embodiment, the ring-shaped supporting layer 4 is arranged inside of the connection pads 213 and is not in contact with any one of the metal wires 3 (e.g., each of the metal wires 3 is located outside of the ring-shaped supporting layer 4 and is entirely embedded in the encapsulant 6), but the present disclosure is not limited thereto. For example, as shown in FIG. 4, a part of each of the metal wires 3 is embedded in the ring-shaped supporting layer 4, and another part of each of the metal wires 3 is embedded in the encapsulant 6.

Specifically, the ring-shaped supporting layer 4 in the present embodiment is a substantially rectangular structure and includes a plurality of strip segments 41 and a plurality of arc-shaped segments 42. Any two of the strip segments 41 adjacent to each other are orthogonal to each other and are connected through one of the arc-shaped segments 42. Moreover, the arc-shaped segments 42 are respectively arranged adjacent to the right angles 23 of the second chip 2. In other words, each of the arc-shaped segments 42 is arranged adjacent to one of the right angles 23.

As shown in FIG. 3 and FIG. 5 to FIG. 7, the light-permeable layer 5 in the present embodiment is a transparent and flat glass board, but the present disclosure is not limited thereto. The light-permeable layer 5 has an outer surface 51, an inner surface 52 opposite to the outer surface 51, and a surrounding lateral surface 53 that is connected to the outer surface 51 and the inner surface 52. The light-permeable layer 5 is disposed on the ring-shaped supporting layer 4 through the inner surface 52, so that the inner surface 52 of the light-permeable layer 5, the ring-shaped supporting layer 4, and the top surface 21 of the sensor chip 2 jointly and surroundingly define an enclosed space E.

The inner surface 52 of the light-permeable layer 5 (e.g., edges of the inner surface 52 connected to the surrounding lateral surface 53) can have a plurality of straight edges 521 and a plurality of rounded corners 522. Any two of the straight edges 521 adjacent to each other are connected through one of the rounded corners 522. It should be noted that the shape of the light-permeable layer 5 can be formed through a suitable manner (e.g., a grinding manner, a laser manner, or an etching manner) according to practical requirements, and the present disclosure is not limited thereto.

Moreover, the straight edges 521 are respectively arranged adjacent to and parallel to the strip segments 41, and any one of the straight edges 521 is spaced apart from an adjacent one of the strip segments 41 by a first inward distance D1. The rounded corners 522 are respectively arranged adjacent to the arc-shaped segments 42, and any one of the rounded corners 522 is spaced apart from an adjacent one of the arc-shaped segments 42 by a second inward distance D2 that is within a range from 95% to 105% of the first inward distance D1.

Accordingly, the light-permeable layer 5 of the sensor package structure 100 in the present embodiment is provided with the rounded corners 522 having a specific condition (e.g., the second inward distance D2 is within a range from 95% to 105% of the first inward distance D1), so that a gap G between the light-permeable layer 5 and the sensor chip 2 corresponding in position to any one of the arc-shaped segments 42 can be effectively shortened, and the gap G can be fully filled with the encapsulant 6, thereby preventing any bubble from existing therein.

Specifically, since the gap G in the present embodiment can be effectively shortened, a portion of the encapsulant 6 in the gap G has a small volume for reducing a stress applied on any one of the arc-shaped segments 42 of the ring-shaped supporting layer 4. For example, the stress applied on any one of the arc-shaped segments 42 of the sensor package structure 100 provided by the present embodiment can be effectively reduced by 22% to 27% compared to a conventional sensor package structure provided with a light-permeable layer having right angles (not shown in the drawings).

In the present embodiment, an arrangement (or a connection relationship) between any one of the rounded corners 522 of the light-permeable layer 5 and the adjacent arc-shaped segment 42 is identical to an arrangement (or a connection relationship) between another one of the rounded corners 522 of the light-permeable layer 5 and the adjacent arc-shaped segment 42, but the present disclosure is not limited thereto. For example, in other embodiments of the present disclosure not shown in the drawings, the arrangement (or the connection relationship) between any one of the rounded corners 522 of the light-permeable layer 5 and the adjacent arc-shaped segment 42 can be slightly different from the arrangement (or the connection relationship) between another one of the rounded corners 522 of the light-permeable layer 5 and the adjacent arc-shaped segment 42.

Moreover, in order to enable the arrangement (or the connection relationship) between any one of the rounded corners 522 of the light-permeable layer 5 and the adjacent arc-shaped segment 42 to provide a desirable effect, the sensor package structure 100 can include at least part of the following features, but the present disclosure is not limited thereto.

Any two of the straight edges 521 adjacent to each other respectively define two virtual extensions intersecting at an intersection point P that is spaced apart from the adjacent one of the arc-shaped segments 42 by an initial inward distance DO, and the second inward distance D2 is within a range from 35% to 70% of the initial inward distance DO.

Any one of the rounded corners 522 has a center of a circle C522 that is located at an inner side of the adjacent one of the arc-shaped segments 42. Moreover, a first projection region defined by orthogonally projecting an outer arc-shaped surface 421 of each of the arc-shaped segments 42 onto the inner surface 52 of the light-permeable layer 5 has a first radial direction R1, and the center of the circle C522 of any one of the rounded corners 522 is located at the first radial direction R1 defined by the adjacent one of the arc-shaped segments 42. In addition, the first projection region has a first radius R421 that is within a range of 70% to 90% of a radius R522 of an adjacent one of the rounded corners 522. Furthermore, a second projection region defined by orthogonally projecting an inner arc-shaped surface 422 of each of the arc-shaped segments 42 onto the inner surface 52 of the light-permeable layer 5 has a second radial direction R2 that overlaps with the first radial direction R1.

Specifically, the first projection region has a first center of a circle C421 that overlaps with the center of the circle C522 of an adjacent one of the rounded corners 522. Moreover, the second projection region has a second center of a circle C422 that overlaps with the first center of the circle C421.

The encapsulant 6 of the present embodiment is opaque for blocking a visible light from passing therethrough. The encapsulant 6 is a solidified liquid encapsulation and is formed on the upper surface 11 of the substrate 1, and edges of the encapsulant 6 are flush with edges of the substrate 1. The sensor chip 2, the ring-shaped supporting layer 4, the light-permeable layer 5, and at least part of each of the metal wires 3 are embedded in the encapsulant 6, and at least part of the outer surface 51 of the light-permeable layer 5 is exposed from the encapsulant 6, but the present disclosure is not limited thereto.

Second Embodiment

Figure 8:
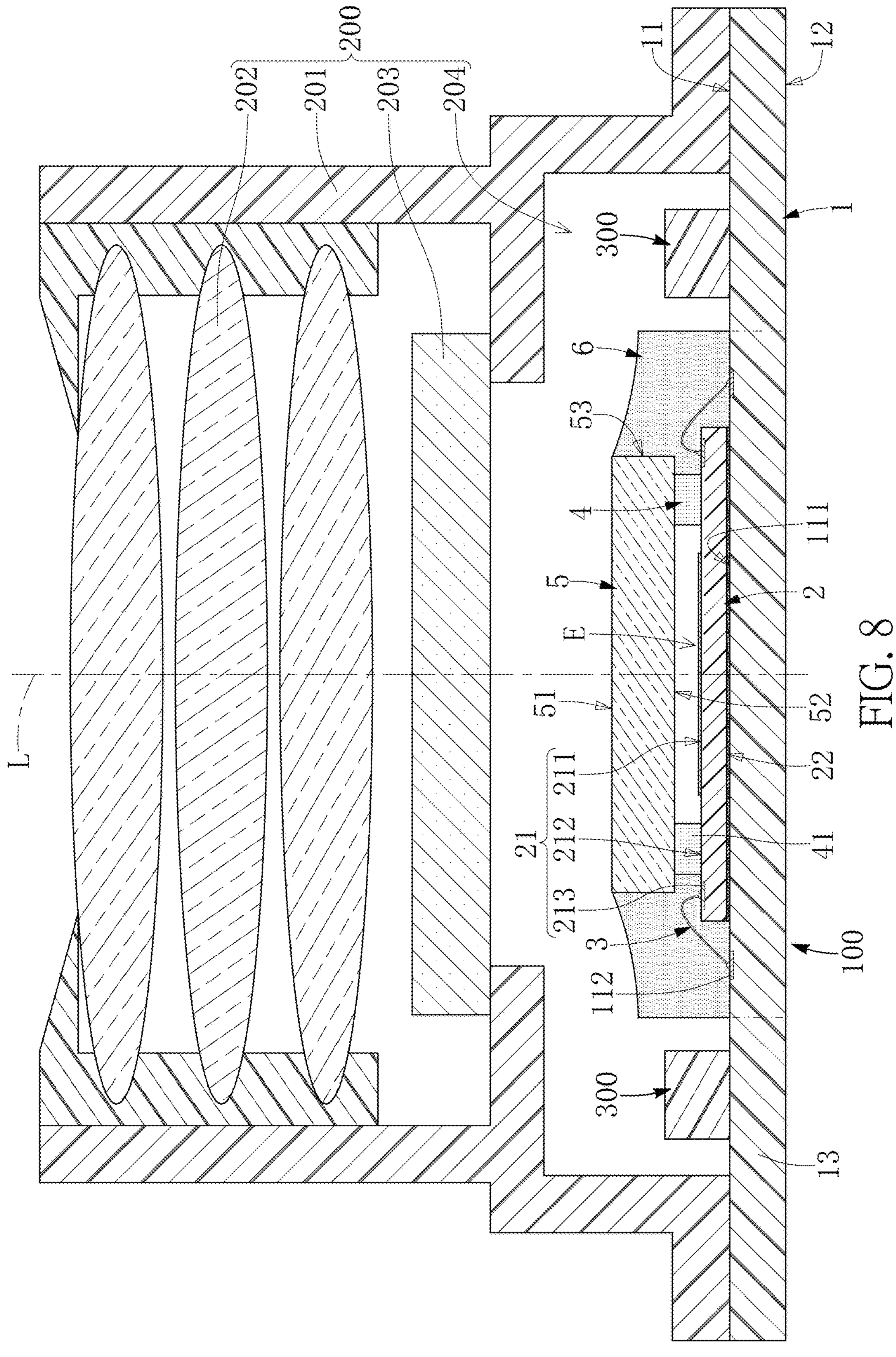
FIG. 8 is a schematic perspective view of the sensor package structure according to a second embodiment of the present disclosure.

Referring to FIG. 8, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

The present embodiment provides a sensor lens assembly, which includes a sensor package structure 100, an optical module 200, and at least one passive electronic component 300. The optical module 200 and the at least one passive electronic component 300 are used in cooperation with the sensor package structure 100. Moreover, the sensor package structure 100 in the present embodiment is substantially identical to that of the first embodiment, but the substrate 1 of the sensor package structure 100 provided by the present embodiment further has an expansion segment 13 protruding from the encapsulant 6. Accordingly, other elements of the sensor package structure 100 of the present embodiment can be referred to in the first embodiment, and the following description does not describe similar elements again for the sake of brevity.

The optical module 200 includes a frame 201, at least one lens 202 assembled in the frame 201, and a filter 203 that is assembled in the frame 201. The frame 201 is fixed onto the expansion segment 13 through a bottom side thereof, a central axis L of the at least one lens 203 passes through the sensing region 211, and the filter 203 is located at the central axis L. The at least one passive electronic component 300 is mounted on the expansion segment 13 and is arranged adjacent to the frame 21. Moreover, a quantity of the at least one passive electronic component 300 can be adjusted or changed according to design requirements, and the present disclosure is not limited thereto.

Specifically, a quantity of the at least one lens 202 in the present embodiment is more than one. The central axes L of the lenses 202 are substantially overlapped with one another. The frame 201, the filter 203, and the upper surface 11 of the substrate 1 jointly define an arrangement space 204 that is provided for receiving the at least one passive electronic component 3, the sensor chip 2, the metal wires 3, the ring-shaped supporting layer 4, the light-permeable layer 5, and the encapsulant 6 therein.

Beneficial Effects of the Embodiments

In conclusion, the light-permeable layer of the sensor package structure in the present disclosure is provided with the rounded corners having a specific condition (e.g., the second inward distance is within a range from 95% to 105% of the first inward distance), so that a gap between the light-permeable layer and the sensor chip corresponding in position to any one of the arc-shaped segments can be effectively shortened, and the gap can be fully filled with the encapsulant, thereby preventing any bubble from existing therein.

Specifically, in any one of the sensor package structure and the sensing module of the present disclosure, since the gap can be effectively shortened, a portion of the encapsulant in the gap has a small volume for reducing a stress applied on any one of the arc-shaped segments of the ring-shaped supporting layer.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A sensor package structure, comprising:

a substrate;

a sensor chip disposed on and electrically coupled to the substrate, wherein a top surface of the sensor chip has a sensing region and a carrying region that surrounds the sensing region;

a ring-shaped supporting layer disposed on the carrying region of the sensor chip and surrounding the sensing region, wherein the ring-shaped supporting layer includes a plurality of strip segments and a plurality of rounded corner segments, and any two of the strip segments adjacent to each other are connected through one of the arc-shaped segments;

a light-permeable layer disposed on the ring-shaped supporting layer, wherein the light-permeable layer, the ring-shaped supporting layer, and the top surface of the sensor chip jointly define an enclosed space, and wherein an inner surface of the light-permeable layer has:

a plurality of straight edges respectively arranged adjacent to and parallel to the strip segments, and wherein any one of the straight edges is spaced apart from an adjacent one of the strip segments by a first inward distance; and a plurality of rounded corners respectively arranged adjacent to the arc-shaped segments, wherein any two of the straight edges adjacent to each other are connected through one of the rounded corners, and wherein any one of the rounded corners is spaced apart from an adjacent one of the arc-shaped segments by a second inward distance that is within a range from 95% to 105% of the first inward distance; and an encapsulant formed on the substrate, wherein the sensor chip, the ring-shaped supporting layer, and the light-permeable layer are embedded in the encapsulant, and an outer surface of the light-permeable layer arranged away from the substrate is at least partially exposed from the encapsulant.

2. The sensor package structure according to claim 1, wherein any two of the straight edges adjacent to each other respectively define two virtual extensions intersecting at an intersection point that is spaced apart from an adjacent one of the arc-shaped segments by an initial inward distance, and the second inward distance is within a range from 35% to 70% of the initial inward distance.

3. The sensor package structure according to claim 1, wherein any one of the rounded corners has a center of a circle that is located at an inner side of the adjacent one of the arc-shaped segments.

4. The sensor package structure according to claim 3, wherein a first projection region defined by orthogonally projecting an outer arc-shaped surface of each of the arc-shaped segments onto the inner surface of the light-permeable layer has a first radial direction, and the center of the circle of any one of the rounded corners is located at the first radial direction defined by the adjacent one of the arc-shaped segments.

5. The sensor package structure according to claim 4, wherein a second projection region defined by orthogonally projecting an inner arc-shaped surface of each of the arc-shaped segments onto the inner surface of the light-permeable layer has a second radial direction that overlaps with the first radial direction.

6. The sensor package structure according to claim 3, wherein a first projection region defined by orthogonally projecting an outer arc-shaped surface of each of the arc-shaped segments onto the inner surface of the light-permeable layer has a first center of a circle that overlaps with the center of the circle of an adjacent one of the rounded corners.

7. The sensor package structure according to claim 6, wherein a second projection region defined by orthogonally projecting an inner arc-shaped surface of each of the arc-shaped segments onto the inner surface of the light-permeable layer has a second center of a circle that overlaps with the first center of the circle.

8. The sensor package structure according to claim 1, wherein a first projection region defined by orthogonally projecting an outer arc-shaped surface of each of the arc-shaped segments onto the inner surface of the light-permeable layer has a first radius that is within a range of 70% to 90% of a radius of an adjacent one of the rounded corners.

9. The sensor package structure according to claim 1, wherein the sensor chip has a plurality of right angles that are respectively arranged adjacent to the arc-shaped segments.

10. A sensing module of a sensor package structure, comprising:

- a sensor chip, wherein a top surface of the sensor chip has a sensing region and a carrying region that surrounds the sensing region;
- a ring-shaped supporting layer disposed on the carrying region of the sensor chip and surrounding the sensing region, wherein the ring-shaped supporting layer includes a plurality of strip segments and a plurality of arc-shaped segments, and any two of the strip segments adjacent to each other are connected through one of the arc-shaped segments; and
- a light-permeable layer disposed on the ring-shaped supporting layer, wherein the light-permeable layer, the ring-shaped supporting layer, and the top surface of the sensor chip jointly define an enclosed space, and wherein an inner surface of the light-permeable layer has:
  - a plurality of straight edges respectively arranged adjacent to and parallel to the strip segments, and wherein any one of the straight edges is spaced apart from an adjacent one of the strip segments by a first inward distance; and
  - a plurality of rounded corners respectively arranged adjacent to the arc-shaped segments, wherein any two of the straight edges adjacent to each other are connected through one of the rounded corners, and wherein any one of the rounded corners is spaced apart from an adjacent one of the arc-shaped segments by a second inward distance that is within a range from 95% to 105% of the first inward distance.

11. The sensing module of the sensor package structure according to claim 10, wherein any two of the straight edges adjacent to each other respectively define two virtual extensions intersecting at an intersection point that is spaced apart from an adjacent one of the arc-shaped segments by an initial inward distance, and the second inward distance is within a range from 35% to 70% of the initial inward distance.

12. The sensing module of the sensor package structure according to claim 10, wherein any one of the rounded corners has a center of a circle that is located at an inner side of the adjacent one of the arc-shaped segments, and wherein a first projection region defined by orthogonally projecting an outer arc-shaped surface of each of the arc-shaped segments onto the inner surface of the light-permeable layer has a first radial direction, and the center of the circle of any one of the rounded corners is located at the first radial direction defined by the adjacent one of the arc-shaped segments.

13. The sensing module of the sensor package structure according to claim 12, wherein a second projection region defined by orthogonally projecting an inner arc-shaped surface of each of the arc-shaped segments onto the inner surface of the light-permeable layer has a second radial direction that overlaps with the first radial direction.

14. The sensing module of the sensor package structure according to claim 10, wherein any one of the rounded corners has a center of a circle that is located at an inner side of the adjacent one of the arc-shaped segments, and a first projection region defined by orthogonally projecting an outer arc-shaped surface of each of the arc-shaped segments onto the inner surface of the light-permeable layer has a first center of a circle that overlaps with the center of the circle of an adjacent one of the rounded corners.

15. The sensing module of the sensor package structure according to claim 14, wherein a second projection region defined by orthogonally projecting an inner arc-shaped surface of each of the arc-shaped segments onto the inner surface of the light-permeable layer has a second center of a circle that overlaps the first center of the circle.

16. The sensing module of the sensor package structure according to claim 10, wherein a first projection region defined by orthogonally projecting an outer arc-shaped surface of each of the arc-shaped segments onto the inner surface of the light-permeable layer has a first radius that is within a range of 70% to 90% of a radius of an adjacent one of the rounded corners.

* * * * *